Oct. 12, 1965

W. F. MOTT ETAL 3,211,464

WORK HOLDING DEVICE

Filed Dec. 31, 1963

INVENTOR.
WALTER F. MOTT
BY NORMAN E. RANK

Cullen, Sloman & Cantor

ATTORNEYS

Oct. 12, 1965 W. F. MOTT ETAL 3,211,464
WORK HOLDING DEVICE
Filed Dec. 31, 1963 2 Sheets-Sheet 2

INVENTOR.
WALTER F. MOTT
BY NORMAN E. RANK

Cullen, Sloman & Cantor
ATTORNEYS

3,211,464
WORK HOLDING DEVICE
Walter F. Mott, 23142 N. Rosedale Court, St. Clair Shores, Mich., and Norman E. Rank, 3062 Myddleton Court, Birmingham, Mich.
Filed Dec. 31, 1963, Ser. No. 334,853
4 Claims. (Cl. 279—123)

This invention relates to a work holding device.

In work holding devices, such as chucks and the like, it is frequently necessary to precisely locate the work piece relative to a predetermined location, such as the center line of the chuck. Conventional work holding devices rapidly lose their precision as their work contacting parts become worn. Moreover, in conventional work holding devices, it is difficult to remove a work piece and then attempt to place it back in the work holding device in precisely the same location.

Hence, it is an object of this invention to provide a work holding device having precision type work holding inserts, which can be manually adjusted to precisely locate a work piece relative to predetermined reference points, and to compensate for wear, with wear being limited to certain easily replaceable parts, and to accurately re-locate work pieces which have previously been removed from the device.

These and other objects and advantages of this invention will become apparent upon reading the following description, of which the attached drawings form a part.

Figure 1:
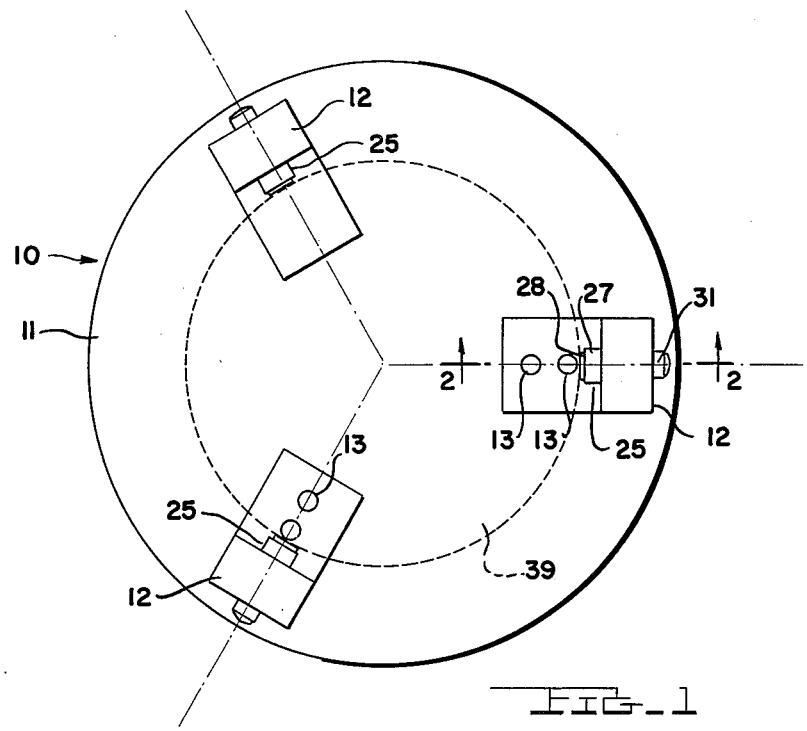
FIG. 1 is a plan view of a chuck embodying the precision work holding device herein.

The drawings illustrate a three-pawed chuck 10 having a conventional chuck body or base 11, shown schematically, and three jaws 12, at least two of which are secured to the base by means of machine screws 13 extending through screw openings 14 in the jaws, with the third jaw being movable in any conventional manner in order to insert a work piece between them. The invention herein may be applied to a chuck having all movable jaws, as well as to other conventional type chucks and similar holding devices.

Each jaw is provided with an opening 15 (see FIG. 3) formed of two different size intersecting bores, the larger of which forms a socket, with a stop or shoulder 16 formed at the point where the two bores intersect. Fitted in the socket is a cylindrical in cross-section, bushing 17 (see FIGS. 2 and 3) having an outer end portion 18, an inner end 19, and a groove 20 formed midway between the ends. Integral with bushing at the outer end portion is an extension portion 21. Extending through the bushing is a bore having a threaded outer portion 22 and an enlarged inner portion.

A gripping member 25, having a threaded shank 26, is threadedly engaged with the threads of the bushing bore portion 22. An enlarged head 27 formed integral with the gripping member shank, has an inner face upon which is brazed or otherwise secured a hard face plate 28, preferably formed of a carbide material, with a serrated or roughened gripping face for gripping against a work piece.

The gripping member 25 is locked at any preset location within the bushing by means of a locking screw 30 which threadedly engages a threaded opening 29 formed in the shank 26. The locking screw has an enlarged head 31 in which is formed a wrench socket 32 for tightening with a standard wrench.

The bushing is removably locked within the socket formed in the jaw member by means of a set screw 35 extending through a threaded opening 36 in the jaw member, with the set screw engaging in the groove 20 of the bushing.

A pair of flats 37 are formed on the inner end of the gripping member head 27 so that the head may be grasped by a wrench to hold the gripping member in a predetermined location relative to the bushing while the locking screw 30 is tightened.

OPERATION

In use (see FIG. 2), the bushing 17 with the gripping member 25 threadedly inserted within it, are inserted within the socket or bore 15 and the set screw 35 is tightened into the groove 20 to hold the bushing in place. The face plate or insert 28 then can press against the external surface of a workpiece 39 for holding such work piece.

The stop or shoulder 16 is used as a reference point to accurately set the position of the gripping member. For example, to center the work piece on the axis of the chuck, the distance between the shoulder 16 and the center of the chuck is determined. Then, the diameter of the work piece is measured, and the difference between said distance and diameter determines the setting of the face 28 relative to the bushing end portion 18.

Hence, before the bushing is inserted within its socket, the gripping member is turned to obtain the proper setting relative to outer end portion 18 and is held by a wrench, engaging its flats 37, while the locking screw 30 is tightened. Then the bushing is inserted into the socket until outer end portion 18 abuts the shoulder 16 and the set screw 35 is tightened.

When the face plate 28 wears, the bushing is removed and the gripping member is again re-set to restore accuracy. When the face plate 28 becomes badly worn, the gripping member can be removed and replaced, or the face plate can be replaced.

Figure 6:
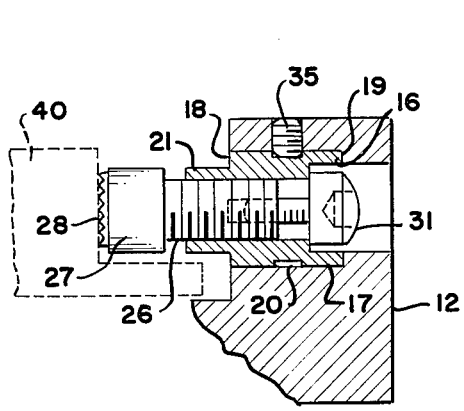
FIG. 6 is a fragmentary cross-sectional view showing the parts arranged in a second work holding position.

As shown in FIG. 6, the bushing can be reversed relative to the socket so that its extension 21 extends inwardly and its inner end 19 abuts the shoulder 16. Here, the gripping member is threaded into the extension end of the bushing and the device is adapted to extend further inwardly relative to the jaw member and particularly, to provide clearance over flanges or the like as may appear on a work piece 40.

Figure 2:
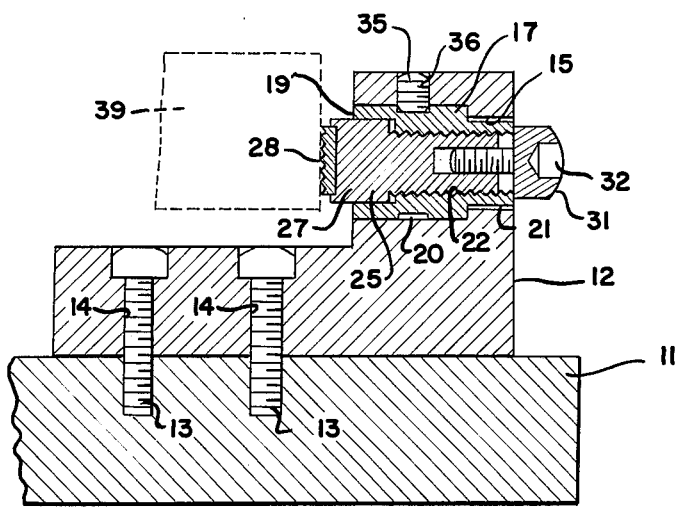
FIG. 2 is an enlarged cross-sectional view taken in the direction of arrows 2—2 of FIG. 1.
Figure 3:
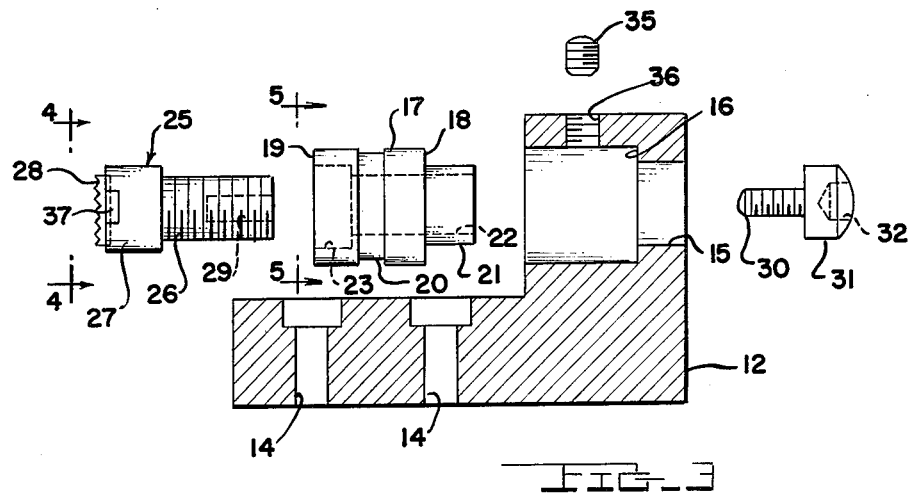
FIG. 3 is an exploded, cross-sectional view of certain of the parts.
Figure 4:
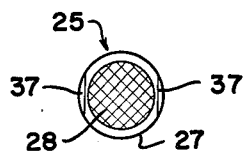
FIG. 4 is an end view of the gripping member taken in the direction of arrows 4—4 of FIG. 3.
Figure 5:
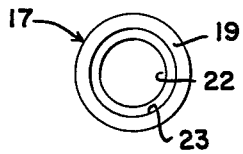
FIG. 5 is an end view of the bushing taken in the direction of arrows 5—5 of FIG. 3.
Figure 7:
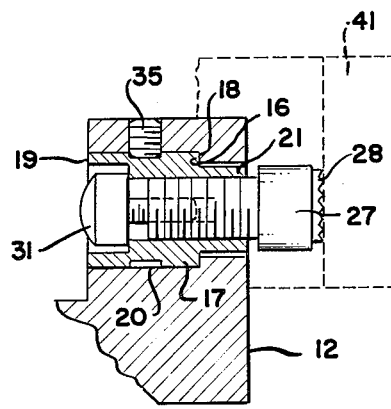
FIG. 7 is a view similar to FIG. 6 but showing the parts arranged in a third work holding position.

As shown in FIG. 7, the bushing may be mounted in the same way as shown in FIG. 2, but with the gripping member threaded into the extension 21 so that the gripping member grips outwardly. For example, it may grip against the inner surface of a ring-shaped work piece 41. In both the instances of FIG. 6 and FIG. 7, the head 31 of the locking screw 30 is abutted against the shoulder formed between the enlarged bore portion 23 and the threaded bore portion 22 of the bushing.

In production work, where the holding device is used to hold runs of different size work pieces, a different set of bushings having pre-set gripping members may be used for each size work piece, by simply changing such sets of bushings for each size work piece. Thus, a single chuck may have a number of sets of pre-set bushings and gripping members, each set to be used for a specific size work piece.

This invention may be further developed within the scope of the following claims. Accordingly, it is desired that the foregoing description be read as being merely illustrative of an operative embodiment of this invention and not in a strictly limited sense.

We now claim:

1. A work piece holding device comprising a jaw member having a socket formed therein and a stop shoulder formed within said socket, a bushing removably secured within said socket and having an end portion abutting said shoulder, the bushing having a central, threaded bore; a gripping member in the form of a threaded shank with an integral, enlarged gripping head, said shank being threadedly engaged in said bore and locking means for locking the shank in fixed positions within the bore; said gripping head extending outwardly of said socket and bushing and having an end face for gripping against a work piece, wherein the location of said end face may be pre-set relative to the socket shoulder by removing the bushing from the socket and threadedly adjusting the shank to pre-set the distance between said bushing portion and said face.

2. A construction as defined in claim 1, and said socket being in the form of an opening extending through the jaw member, the opening being constricted at a location within the jaw member to form said shoulder, and said locking means comprising a headed locking screw fitted within a threaded opening formed in the free end of said shank, with the head of said locking screw abutting an end of said bushing.

3. A construction as defined in claim 2, and said bushing having an integral extension formed on one end thereof and of a diameter to fit within the constricted end of said jaw member opening, and said end portion being formed on said bushing at the juncture between the bushing and its extension, wherein said bushing may be reversed relative to the socket so that its opposite end abuts said socket shoulder and said shank may be threaded into either end of the bushing.

4. A construction as defined in claim 3, and means for releasibly securing said bushing within said socket, said means comprising a grove formed in the outer surface of said bushing, mid-way between its end portion and opposite end, and a set screw threadedly mounted in said jaw member and engaging into said groove.

References Cited by the Examiner

UNITED STATES PATENTS 2,565,430   8/51   Hohwart.

FOREIGN PATENTS 640,350   4/62   Canada.
166,768   7/21   Great Britain.

ROBERT C. RIORDON, *Primary Examiner.*